(12) United States Patent
Flamm et al.

(10) Patent No.: US 12,251,776 B2
(45) Date of Patent: Mar. 18, 2025

(54) METHOD AND DEVICE FOR LASER PROCESSING A WORKPIECE

(71) Applicant: TRUMPF Laser- und Systemtechnik GmbH, Ditzingen (DE)

(72) Inventors: Daniel Flamm, Ludwigsburg (DE); Myriam Kaiser, Heimsheim (DE); Jonas Kleiner, Leonberg (DE)

(73) Assignee: TRUMPF LASER- UND SYSTEMTECHNIK SE, Ditzingen (DE)

( * ) Notice: Subject to any disclaimer, the term of this patent is extended or adjusted under 35 U.S.C. 154(b) by 0 days.

(21) Appl. No.: 18/422,033

(22) Filed: Jan. 25, 2024

(65) Prior Publication Data
US 2024/0165737 A1 May 23, 2024

Related U.S. Application Data

(63) Continuation of application No. PCT/EP2022/071799, filed on Aug. 3, 2022.

(30) Foreign Application Priority Data

Aug. 4, 2021 (DE) .................... 10 2021 120 286.8

(51) Int. Cl.
*B23K 26/067* (2006.01)
*B23K 26/06* (2014.01)
(52) U.S. Cl.
CPC ........ *B23K 26/067* (2013.01); *B23K 26/0648* (2013.01)
(58) Field of Classification Search
CPC ...... B23K 26/53; B23K 26/55; B23K 26/067; B23K 26/0006; B23K 26/0617;
(Continued)

(56) References Cited

U.S. PATENT DOCUMENTS 11,150,483 B2 10/2021 Kumkar et al.
2007/0111478 A1* 5/2007 Komura ............... B28D 5/0011
257/E21.599
(Continued)

FOREIGN PATENT DOCUMENTS

CN 104646834 A 5/2015
DE 102014116958 A1 5/2016
(Continued)

OTHER PUBLICATIONS

KR-20140020776-A English translation (Year: 2014).*
(Continued)

*Primary Examiner* — Hung D Nguyen
(74) *Attorney, Agent, or Firm* — LEYDIG, VOIT & MAYER, LTD.

(57) ABSTRACT

A method for laser processing a workpiece is provided. The workpiece includes a material transparent to a laser beam of the laser processing. The method includes splitting an input laser beam by using a beam splitter into a plurality of partial beams. The splitting of the input laser beam is performed by application of phases to a beam cross section of the input laser beam. The method further includes focusing the plurality of partial beams decoupled from the beam splitter by using a focusing optical unit. Multiple focus elements are formed by the focusing of the plurality of partial beams. The method further includes subjecting the material of the workpiece to at least a subset of the multiple focus elements. The application of the phases is performed in such a way that at least two of the multiple focus elements have different intensities.

15 Claims, 6 Drawing Sheets

(58) Field of Classification Search
CPC ............ B23K 26/0624; B23K 26/0648; B23K 26/0652; B23K 26/0676; B23K 26/352; C03B 33/0222; C03B 33/09
See application file for complete search history.

(56) References Cited

U.S. PATENT DOCUMENTS

| | | |
|---|---|---|
| 2014/0239552 A1 | 8/2014 | Srinivas et al. |
| 2015/0165548 A1 | 6/2015 | Marjanovic et al. |
| 2019/0135678 A1* | 5/2019 | Liu .................. B23K 26/0617 |
| 2022/0184744 A1 | 6/2022 | Kumkar et al. |
| 2022/0258284 A1 | 8/2022 | Flamm et al. |
| 2023/0036386 A1* | 2/2023 | Taylor ................ B23K 26/0652 |
| 2023/0182234 A1 | 6/2023 | Flamm et al. |

FOREIGN PATENT DOCUMENTS

| | | |
|---|---|---|
| DE | 102019121827 A1 | 2/2021 |
| DE | 102019217577 A1 | 5/2021 |
| DE | 102020207715 A1 | 12/2021 |
| JP | 2020004889 A | 1/2020 |
| KR | 20140020776 A * | 2/2014 |
| WO | WO 2023012210 A1 | 2/2023 |

OTHER PUBLICATIONS

Ioannis D. Chremmos et al., "Bessel-like optical beams with arbitrary trajectories," Optics Letters, Dec. 2012, pp. 5003-5005, vol. 37, Issue 23, Optica Publishing Group, Washington, DC, USA.

Flamm, D. et al, "Structured light for ultrafast laser micro-and nanoprocessing," Optical Engineering , Feb. 2021, pp. 025105-025105, vol. 60, Issue 2, SPIE digital library, Washington, USA.

Kazuyoshi Itoh et al, "Ultrafast Processes for Bulk Modification of Transparent Materials," MRS Bulletin, Aug. 2006, pp. 620-625, vol. 31—Issue 8, Published online by Cambridge University Press: Jan. 31, 2011, Cambridge, United Kingdom.

Jenne, Michael, et al, "Facilitated glass separation by asymmetric Bessel-like beams," Optics express, 2020, pp. 6552-6564, vol. 28, Issue 5, Optica Publishing Group, Washington, DC, USA.

Khonina, Svetlana N., et aL;., "Application of a binary curved fork grating for the generation and detection of optical vortices outside the focal plane," JOSA B 37, 2020, pp. 1714-1721, No. 6, Optica Publishing Group, Washington, DC, USA.

* cited by examiner

METHOD AND DEVICE FOR LASER PROCESSING A WORKPIECE

CROSS REFERENCE TO RELATED APPLICATIONS

This application is a continuation of International Application No. PCT/EP2022/071799 (WO 2023/012210 A1), filed on Aug. 3, 2022, and claims benefit to German Patent Application No. DE 10 2021 120 286.8, filed on Aug. 4, 2021. The aforementioned applications are hereby incorporated by reference herein.

FIELD

Embodiments of the present invention relate to a method for laser processing a workpiece.

Embodiments of the invention also relate to a device for laser processing a workpiece.

BACKGROUND

A diffractive optical beam forming element for applying a phase characteristic to laser beam provided for laser processing a material substantially transparent to the laser beam using a phase mask is known from DE 10 2014 116 958 A1, which is designed for applying a plurality of beam forming phase characteristics to the laser beam incident on the phase mask, wherein at least one of the plurality of beam forming phase characteristics is assigned a virtual optical image, which can be imaged in at least one elongated focus zone to form a modification in the material to be processed.

A device and a method for cutting and in particular a substrate are known from JP 2020 004 889 A, wherein a plurality of focus points are generated by means of a spatial light modulator.

SUMMARY

Embodiments of the present invention provide a method for laser processing a workpiece. The workpiece includes a material transparent to a laser beam of the laser processing. The method includes splitting an input laser beam by using a beam splitter into a plurality of partial beams. The splitting of the input laser beam is performed by application of phases to a beam cross section of the input laser beam. The method further includes focusing the plurality of partial beams decoupled from the beam splitter by using a focusing optical unit. Multiple focus elements are formed by the focusing of the plurality of partial beams. The method further includes subjecting the material of the workpiece to at least a subset of the multiple focus elements. The application of the phases is performed in such a way that at least two of the multiple focus elements have different intensities.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
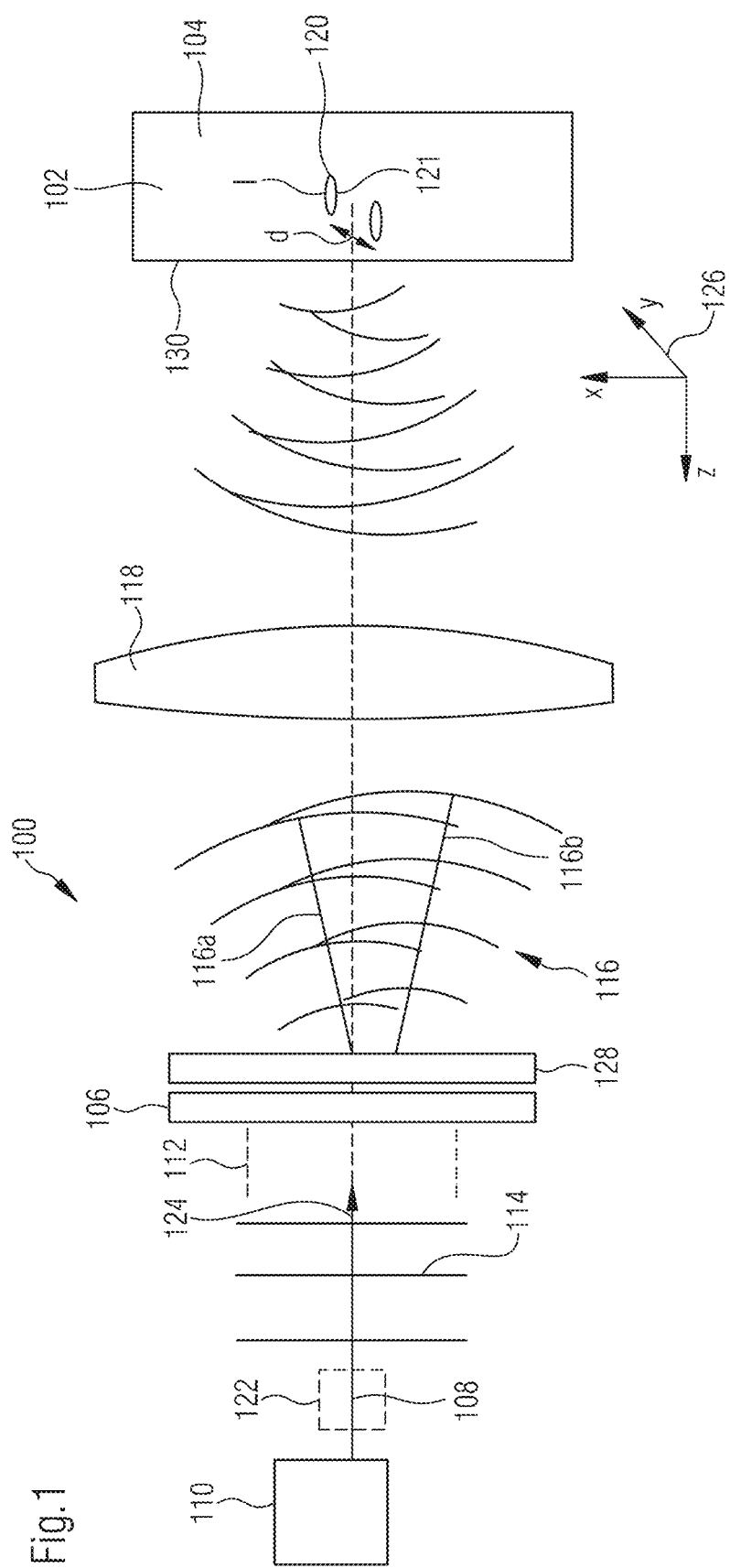
FIG. 1 shows a schematic illustration of a device for laser processing a workpiece according to some embodiments.

Embodiments of the invention provide a method for laser processing of a workpiece, by means of which a formation of material modifications in the material of the workpiece can be monitored and/or reproduced better, so that in particular improved material severing is enabled.

According to embodiments of the invention, in the method, an input laser beam is split by means of a beam splitting element into a plurality of partial beams, wherein the splitting of the input laser beam by means of the beam splitting element is carried out by application of phases to a beam cross section of the input laser beam, partial beams decoupled from the beam splitting element are focused by means of a focusing optical unit, multiple focus elements are formed by focusing the partial beams, and in which the material of the workpiece is subjected to at least a subset of the focus elements formed for laser processing, the application of phases by means of the beam splitting element takes place in such a way that at least two of the focus elements formed have different intensities.

It has been shown that to form material modifications close to the surface, i.e., material modifications lying close to an outer side and/or upper side of the workpiece, lower intensities are necessary than to form material modifications which are formed deep in the volume of the material, i.e., farther away from the closest outer side and/or upper side of the workpiece. By forming multiple focus elements having different intensities, material modifications may be formed in the material of the workpiece which have identical properties independently of their depth positioning in the volume of the material. In particular a homogeneity of the material modifications in the thickness direction and/or depth direction of the material may thus be improved. In particular material severing having improved quality and/or homogeneity can thus be achieved.

In particular, at least two of the focus elements formed, to which the material of the workpiece is subjected for laser processing, have different intensities.

In particular, the focus elements formed are each arranged at different spatial positions.

Different intensities of focus elements is to be understood in particular to mean that focus elements arranged at different spatial positions each have different intensities.

In particular, the intensity of a specific focus element is to be understood as a three-dimensional average intensity or a maximum intensity of the focus element.

In particular, the respective intensity of the focus elements is defined within a specific medium neglecting absorption effects of this medium. For example, the intensity is defined in air and/or in glass.

In particular, the intensities of the focus elements formed are at least approximately constant over time during the laser processing of the workpiece.

In particular, focus elements different from one another are spaced apart from one another and/or are arranged at different spatial positions. It is fundamentally possible that focus elements different from one another spatially overlap in sections.

The spatial position of a specific focus element is to be understood in particular as a center point position of the corresponding focus element.

It can be favorable if the intensity of the focus elements is selected so that identical material modifications are produced in the material by subjecting the material to the focus elements and in particular identical material modifications are produced in the material independently of a distance of the respective focus elements to an outer side of the workpiece closest to the respective focus elements. An optimized ability to sever the material along the material modifications formed thus results. Severing may thus be implemented, for example, with increased homogeneity and/or with smoother severed edge.

Identical material modifications are to be understood in particular as material modifications which at least approximately have an equal selective etching capability and/or an equal spatial extension.

In particular, the identical material modifications have identical or similar etching properties. In particular, optimized severing of the material by etching by means of a wet-chemical solution may thus be achieved.

It can be advantageous if the intensity of the focus elements is selected as a function of a distance and/or distance range, by which the respective focus elements are spaced apart from an outer side of the workpiece and in particular from an outer side of the workpiece closest to the respective focus elements. At least approximately identical material modifications may thus be formed in the material independently of their distance and/or distance range.

A distance range is to be understood in particular as distances to the outer side and in particular to the closest outer side of the workpiece lying within a specific interval.

In particular, a specific focus element is uniquely assigned in each case to a specific distance range. In particular, different distance ranges do not overlap.

A distance direction of the distance or distance range is in particular oriented parallel to a thickness direction of the workpiece.

The workpiece is, for example, formed plate-shaped and/or panel-shaped.

It can be advantageous if the intensity of the focus elements is selected to be increasingly greater with increasing distance of the respective focus elements to the closest outer side of the workpiece. Material modifications lying deeper in the volume of the workpiece may thus be formed at least approximately identically to material modifications not lying as deep.

For the same reason, it can be favorable if an average intensity of respective focus elements, which are assigned to a specific distance range, is selected to be increasingly greater with increasing mean distance of the respective distance range to the closest outer side of the workpiece.

In particular, it can be provided that a relative intensity of the focus elements formed varies by a factor of at least 1.5 and/or at most 5.0, preferably of at least 2.0 and/or at most 3.0, and preferably of 2.5.

If the relative intensity of the focus elements formed varies, for example, by a factor of 2.0, this means that the focus elements formed comprise at least one focus element having a least intensity and at least one focus element having a greatest intensity, wherein the intensity of the focus element having the greatest intensity is greater by a factor of 2.0 than the intensity of the focus element having the least intensity.

In particular, it can be provided that at least one distance range is provided, wherein the intensity of respective focus elements which lie within this at least one distance range is at least approximately constant. For example, multiple distance ranges are then provided, the assigned focus elements of which each have different intensities. For example, the intensity of the focus elements then varies in steps.

In particular, it can be provided that at least one distance range is provided, wherein the intensity of respective focus elements which lie within this at least one distance range is varying, and wherein in particular the intensity of the focus elements lying in this distance range increases with increasing distance of these focus elements to the closest outer side of the workpiece. In particular, the respective intensities of two or more or all of the focus elements lying in this distance range are then different. For example, the intensity of focus elements adjacent to one another is then different in each case.

For example, a first distance range is provided, in which the intensity of respective focus elements which lie within this first distance range is varying, and a further distance range, in which the intensity of respective focus elements which lie within this further distance range is at least approximately constant. The first distance range then, for example, adjoins an outer side of the workpiece or encloses an outer side of the workpiece. The further distance range then for example lies completely within the material of the workpiece and in particular adjoins the first distance range.

For example, an intensity of the focus elements of the further distance range is then preferably greater by a factor of at least 1.5 to 5.0, preferably of 2.0 to 3.0, preferably of 2.5 than the intensity of the focus elements of the first distance range.

It can be advantageous if focus elements different from one another are arranged along a predetermined processing line, and in particular if the focus elements different from one another are spaced apart along the processing line and/or have an intensity such that by subjecting the material of the workpiece to these focus elements, material modifications are formed in the material which enable severing of the material along this processing line. During the laser processing of the material, a formation of material modifications along this processing line or along a processing surface corresponding to this processing line thus results. In particular, the material can be severed along this processing line or processing surface.

For example, the at least one processing line has a total length of between 50 μm and 5000 μM.

In particular, it can be provided that the material of the workpiece can be severed or is severed by exerting a thermal impingement and/or a mechanical tension and/or by etching by means of at least one wet-chemical solution. For example, the etching takes place in an ultrasound-assisted etching bath.

In particular, it can be provided that the processing line is formed spatially continuously over a thickness of the material of the workpiece.

The processing line is not necessarily formed spatially coherent, but can have different spatially separated sections. In particular, the processing line can have gaps and/or interruptions in which no focus elements are arranged.

In particular, the processing line is or comprises a connecting line between focus elements adjacent to one another.

In particular, it can be provided that an angle of attack between the processing line and an outer side of the workpiece, through which the focus elements for laser processing are coupled into the material of the workpiece, is at least 1° and/or at most 90°. Thus, for example, a perpendicular cut may be executed on the workpiece or the workpiece may be chamfered at a specific angle.

In particular, it can be provided that the angle of attack of the processing line is constant at least in sections, and/or that the processing line has multiple sections having different angles of attack.

In particular, it can be provided that the processing line is a straight line at least in sections, and/or that the processing line is a curve at least in sections.

By embodying the processing line as a curve, for example, rounded segments may be severed from the workpiece. For example, rounded edges may thus be created.

If the processing line is embodied as a curve, the processing line is, for example, assigned a specific angle of attack range, which the processing line has with respect to the outer side of the workpiece.

It can be favorable if one or more of the focus elements formed will be arranged or are arranged at least in sections and/or at least temporarily outside a material of the workpiece during the laser processing of the workpiece. In particular, it is thus possible that the material of the workpiece is still subjected to focus elements in the area of the outer side during the laser processing in case of thickness variations and/or in case of focal position variations.

In particular, the processing line protrudes during the laser processing beyond at least one outer side of the workpiece in the thickness direction of the workpiece and/or at least temporarily protrudes beyond an outer side of the workpiece.

For example, focus elements arranged outside the material of the workpiece are spaced apart at a distance to an outer side of the workpiece closest to these focus elements.

For example, a section of the processing line arranged outside the material is a tangential extension of the processing line at an endpoint and/or end section of the processing line arranged inside the material.

In particular, it can be provided that the focus elements are moved relative to the material of the workpiece at a feed speed for laser processing of the workpiece.

In particular, the processing line having the focus elements for laser processing the workpiece is moved relative to the workpiece at a feed speed oriented in the feed direction. In particular a processing surface corresponding to the processing line is thus formed, along which material modifications are arranged.

The focus elements preferably each lie at least in sections in a plane, which is oriented in particular perpendicular to the feed direction. In particular, all focus elements formed lie in this plane.

It can be favorable if polarization beam splitting is carried out by means of a polarization beam splitting element, so that the partial beams have one of at least two different polarization states, wherein focus elements having different polarization states are formed by focusing the partial beams by means of the focusing optical unit, and wherein in particular focus elements having different polarization states are arranged adjacent to one another. In particular interference of focus elements adjacent to one another is thus prevented. Focus elements adjacent to one another may thus be arranged at a small distance from one another.

The material modifications introduced into transparent materials by ultrashort laser pulses are divided into three different classes; see K. Itoh et al. "Ultrafast Processes for Bulk Modification of Transparent Materials" MRS Bulletin, vol. 31, p. 620 (2006): Type I is an isotropic refractive index change; type II is a birefringent refractive index change; and type III is what is known as a void or cavity. In this respect, the material modification created depends on laser parameters of the laser beam, from which the focal zone is formed, such as the pulse duration, the wavelength, the pulse energy, and the repetition frequency of the laser beam, and on the material properties such as, among other things, the electronic structure and the coefficient of thermal expansion, and also on the numerical aperture (NA) of the focusing.

The type I isotropic refractive index changes are traced back to locally restricted fusing by way of the laser pulses and fast resolidification of the transparent material. For example, quartz glass has a higher density and refractive index of the material if the quartz glass is cooled more quickly from a higher temperature. Thus, if the material in the focal volume melts and subsequently cools down quickly, then the quartz glass has a higher refractive index in the regions of the material modification than in the non-modified regions.

The type II birefringent refractive index changes may arise, for example, due to interference between the ultrashort laser pulse and the electric field of the plasma generated by the laser pulses. This interference leads to periodic modulations in the electron plasma density, which leads to a birefringent property, which is to say directionally dependent refractive indices, of the transparent material upon solidification. A type II modification is, for example, also accompanied by the formation of so-called nanogratings.

By way of example, the voids (cavities) of the type III modifications can be produced using a high laser pulse energy. In this context, the formation of the voids is ascribed to an explosion-like expansion of highly excited, vaporized material from the focal volume into the surrounding material. This process is also referred to as a micro-explosion. Since this expansion occurs within the mass of the material, the micro-explosion leaves behind a less dense or hollow core (the void), or a microscopic defect in the sub-micrometer range or in the atomic range, which void or defect is surrounded by a compacted material envelope. Stresses which can result in spontaneous cracking or which can promote cracking arise in the transparent material due to the compaction at the shock front of the micro-explosion.

In particular, the formation of voids may also be accompanied by type I and type II modifications. By way of example, type I and type II modifications can arise in the less stressed areas around the introduced laser pulses. Accordingly, if reference is made to the introduction of a type III modification, then a less dense or hollow core or a defect is present in any case. By way of example, it is not a cavity but a region of lower density that is produced in sapphire by the micro-explosion of the type III modification. Due to the material stresses that arise in the case of a type III modification, such a modification moreover often is accompanied by, or at least promotes, a formation of cracks. The formation of type I and type II modifications cannot be completely suppressed or avoided when type III modifications are introduced. Finding "pure" type III modifications is therefore unlikely.

At high repetition rates of the laser beam, the material cannot cool down completely between the pulses, so that cumulative effects of the heat introduced from pulse to pulse can influence the material modification. By way of example, the repetition frequency of the laser beam can be higher than the reciprocal of the thermal diffusion time of the material, with the result that heat accumulation as a result of successive absorption of laser energy can occur in the focus elements until the melting temperature of the material has been reached. Moreover, a region larger than the focus elements can be fused by the thermal transport of the thermal energy into the areas surrounding the focus elements. The heated material cools quickly following the introduction of ultrashort laser pulses, and so the density and other structural properties of the high-temperature state are, as it were, frozen in the material.

In particular, it can be provided that material modifications, which are associated with a crack formation of the material, are formed in the material by subjecting the material of the workpiece to the focus elements and/or that type III material modifications are formed in the material by subjecting a material of the workpiece to the focus elements.

The formation of material modifications being associated with crack formation is to be understood in particular to mean that the formation of the material modifications is accompanied by a crack formation in the material and/or that crack formation takes place in the material when the material modifications are formed.

In particular, it can be provided that material modifications, which are associated with a change of the index of refraction of the material, are formed in the material by subjecting the material of the workpiece to the focus elements and/or that type I material modifications and/or type II material modifications are formed in the material by subjecting a material of the workpiece to the focus elements.

The material modifications being associated with a change of the refractive index of the material is to be understood in particular to mean that the formation of the material modifications is accompanied by a change in the refractive index of the material and/or that there is a change in the refractive index of the material when the material modifications are formed.

According to embodiments of the invention, a device for laser processing a workpiece is provided, in which the application of phases by means of the beam splitting element is carried out such that at least two of the focus elements formed have different intensities.

In particular, the device comprises at least one polarization beam splitting element, which is arranged before or after the beam splitting element with respect to a beam propagation direction of the input laser beam, wherein polarization beam splitting is carried out by means of the polarization beam splitting element such that the partial beams incident on the focusing optical unit each have one of at least two different polarization states and that focus elements having different polarization states are formed by focusing the partial beams by means of the focusing optical unit.

In particular, the focus elements are formed from the input laser beam, wherein the focus elements are formed in particular by forming and/or beam forming of the input laser beam.

In particular, it can be provided that the splitting of the input laser beam by means of the beam splitting element is performed by phase manipulation of a phase of the input laser beam. In particular, the splitting of the input laser beam is performed exclusively by phase manipulation of the phase of the input laser beam.

The focusing optical unit is not necessarily designed as a separate optical element. It is also possible in principle that the focusing optical unit is integrated in another component of the device, for example, in the beam splitting element and/or in a polarization beam splitting element.

In particular, an application of phases to the beam cross section of the first input beam carried out by means of the beam splitting element is settable and/or definable variably.

In particular, the beam splitting element is formed as a diffractive beam splitting element and/or as a 3D beam splitting element.

In particular, the device according to embodiments of the invention comprises a laser source for providing the input laser beam, which is in particular a pulsed laser beam and/or an ultrashort pulse laser beam.

In particular, the material of the workpiece is produced from a material transparent to the input laser beam and/or from a material transparent to a laser beam from which the focus elements are formed.

A transparent material is to be understood to mean in particular a material through which at least 70% and in particular at least 80% and in particular at least 90% of a laser energy of a laser beam from which the focus elements are formed is transmitted.

In particular, the focus elements are formed from an ultrashort pulse laser beam or provided by means of an ultrashort pulse laser beam. This ultrashort pulse laser beam comprises ultrashort laser pulses in particular.

For example, a wavelength of the input laser beam and/or of the laser beam from which the focus elements are formed is at least 300 nm and/or at most 1500 nm. For example, the wavelength is 515 nm or 1030 nm.

In particular, the input laser beam and/or the laser beam from which the focus elements are formed has an average power of at least 1 W to 1 kW. For example, the laser beam comprises pulses having a pulse energy of at least 100 and/or at most 50 mJ. It can be provided that the laser beam comprises individual pulses or bursts, wherein the bursts have 2 to 20 subpulses and in particular a time interval of approximately 20 ns.

A focus element is to be understood in particular as a radiation area having a specific spatial extension. To determine spatial dimensions of a specific focus element, such as a diameter of the focus element, only intensity values above a specific intensity threshold are considered. In this respect, the intensity threshold is selected, for example, such that values below this intensity threshold have such a low intensity that they are no longer relevant for interaction with the material for the purpose of forming material modifications. For example, the intensity threshold is 50% of a global intensity maximum of the focus element.

In particular, the specifications "at least approximately" or "approximately" should be understood to mean in general a deviation of at most 10%. Unless stated otherwise, the specifications "at least approximately" or "approximately" are to be understood to mean in particular that an actual value and/or distance and/or angle deviates by no more than 10% from an ideal value and/or distance and/or angle.

The following description of preferred embodiments serves to explain the invention in greater detail in association with the drawings.

Elements which are the same or have equivalent functions are provided with the same reference signs in all of the figures.

One exemplary embodiment of a device for laser processing a workpiece is shown in FIG. 1 and designated therein by 100. Localized material modifications, such as defects in the sub-micrometer range or atomic range, which result in material weakening, may be produced by means of the device 100 in a material 102 of the workpiece 104. At these material modifications, the workpiece 104 may be severed or, for example, a workpiece segment may be severed from the workpiece 104.

In particular, material modifications may be introduced at an angle of attack into the material 102 by means of the device 100, so that an edge area of the workpiece 104 may be chamfered or beveled by severing a corresponding workpiece segment from the workpiece 104.

The device 100 comprises a beam splitting element 106, into which an input laser beam 108 is coupled. This input laser beam 108 is provided, for example, by means of a laser source 110. The input laser beam 108 is, for example, a pulsed laser beam and/or an ultrashort pulse laser beam.

In particular, the input laser beam 108 is to be understood as a beam bundle which comprises a plurality of beams extending in parallel in particular. The input laser beam 108 in particular has a transverse beam cross section 112 and/or a transverse beam extension, with which the input laser beam 108 is incident on the beam splitting element 106.

The input laser beam 108 incident on the beam splitting element 106 in particular has at least approximately planar wavefronts 114.

The input laser beam 108 is split by means of the beam splitting element 106 into a plurality of partial beams 116 and/or partial beam bundles. In the example shown in FIG. 1, two different partial beams 116a and 116b are indicated.

The partial beams 116 decoupled from the beam splitting element 106 in particular have a divergent beam profile.

To focus the partial beams 116 decoupled from the beam splitting element 106, the device 100 comprises a focusing optical unit 118, into which the partial beams 116 are coupled. The focusing optical unit 118 is designed, for example, as a microscope objective and/or lens element.

In particular, mutually different partial beams 116 are incident on the focusing optical unit 118 with a position offset and/or angular offset.

The partial beams 116 are focused by means of the focusing optical unit 118, so that multiple focus elements 120 are formed, which are each arranged at different spatial positions. It is possible in principle that mutually adjacent focus elements 120 spatially overlap in sections.

For example, one or more partial beams 116 and/or partial beam bundles are each assigned to a respective focus element 120. For example, a respective focus element 120 is formed by focusing one or more partial beams 116 and/or partial beam bundles.

For laser processing the workpiece 104, the focus elements 120 are introduced into the material 102 of the workpiece 104 and moved relative to the material 102.

A specific focus distribution is assigned to the input laser beam 108 which is coupled into the beam splitting element 106. This focus distribution describes a geometric shape and/or an intensity profile of a focus element which would be formed by focusing the input laser beam 108 before coupling into the beam splitting element 106. In particular, the geometric shape is to be understood as a spatial shape and/or spatial extension of the focus element formed.

For example, the input laser beam 108, if it is provided, for example, by means of the laser source 110, has a Gaussian beam profile. By focusing the input laser beam 108, a focus element would be formed in this case which has a focus distribution having Gaussian shape and/or Gaussian intensity profile.

Alternatively thereto, for example, it can be provided that a Bessel-like beam profile is assigned to the input laser beam 108, so that by focusing the input laser beam 108, a focus element would be formed which has a focus distribution having Bessel-like shape and/or Bessel-like intensity profile.

The focus distribution of the input laser beam 108 is assigned to the partial beams 116 and/or partial beam bundles formed by splitting the input laser beam 108 by means of the beam splitting element 106 such that by focusing the partial beams 116, the focus elements 120 are formed having this focus distribution and/or having a focus distribution based on this focus distribution.

In the example shown in FIG. 1, the input laser beam 108 has a Gaussian beam profile, i.e., a focus distribution having Gaussian shape and/or Gaussian intensity profile is assigned to the input laser beam 108. The focus elements 120 then each, for example, have a focus distribution 121 having this Gaussian shape and/or this Gaussian intensity profile and/or having a shape and/or intensity profile based on this Gaussian shape and/or this Gaussian intensity profile, respectively.

The focus distribution 121 is a property of the respective focus elements 120 and describes their shape and/or intensity profile.

If, for example, a Bessel-like beam profile is assigned to the input laser beam 108, the focus elements 120 formed for laser processing the workpiece 104 each have a focus distribution 121 having this Bessel-like beam profile or having a beam profile based on this Bessel-like profile. The focus elements 120 may thus each be formed, for example, having a focus distribution which has an elongated shape and/or an elongated intensity profile.

It can be provided that the device 100 has a beam forming device 122 for beam forming of the input laser beam 108 (indicated in FIG. 1). For example, this beam forming device 122 is arranged in front of the beam splitting element 106 and/or between the laser source 110 and the beam splitting element 106 with respect to a beam propagation direction 124 of the input laser beam 108.

A specific focus distribution and/or a specific beam profile may be assigned in particular to the input laser beam 108 by means of the beam forming device 122.

The beam forming device 122 can be configured, for example, to form a laser beam having quasi-non-diffracting and/or Bessel-like beam profile from a laser beam having Gaussian beam profile. The input laser beam 108 coupled into the beam splitting element 106 then accordingly has the quasi-non-diffracting and/or Bessel-like beam profile.

In terms of the formation and properties of quasi-non-diffracting and/or Bessel-like beams with curved shapes, reference is made to the scientific publication "Bessel-like optical beams with arbitrary trajectories" by I. Chremmos et al., Optics Letters, vol. 37, no. 23, Dec. 1, 2012.

In particular the focus elements 120 are each formed as copies by beam splitting by means of the beam splitting element 106. In particular, one or more of the focus elements 120 formed have the same geometric shape and/or the same intensity profile.

In particular, a respective distance d and/or a position offset between mutually adjacent focus elements 120 can be set by means of the beam splitting element 106. A distance direction of the distance d settable by means of the beam splitting element 106 preferably lies in a plane which is oriented transversely and in particular perpendicularly to a feed direction 126, in which the focus elements 120 are moved relative to the workpiece 104 for laser processing the workpiece 104. The distance d is, for example, settable by means of the beam splitting element 106 by component in two spatial directions, which span the mentioned plane or lie in the mentioned plane (x direction and z direction in the example shown in FIG. 1).

The feed direction 126 is oriented parallel to the y direction, which is perpendicular to the x direction and the z direction, in the example shown in FIG. 1.

In particular, to set the distance d, the partial beams 116 are formed such that they are incident on the focusing optical unit 118 with a specific position offset and/or with a specific convergence and/or divergence. The partial beams 116 are then focused by means of the focusing optical unit 118, so that the focus elements 120 are formed having the corresponding distance d and/or the position offset.

Furthermore, a specific intensity I may be assigned to each of the focus elements 120 formed by means of the beam splitting element 106. In particular, the respective intensity I of a specific focus element 120 is set by means of the beam splitting element 106 and in particular is set by application of phases to the input laser beam 108. The focus elements 120 are then formed having a defined intensity I by focusing the partial beams 116 decoupled from the beam splitting element 106.

In particular, the intensity I of a specific focus element 120 is to be understood as an absolute intensity and/or an average intensity of the corresponding focus element 120.

It is provided that the beam splitting is carried out by means of the beam splitting element 106 such that two or more of the focus elements 120 formed each have a different intensity I.

Figure 5:
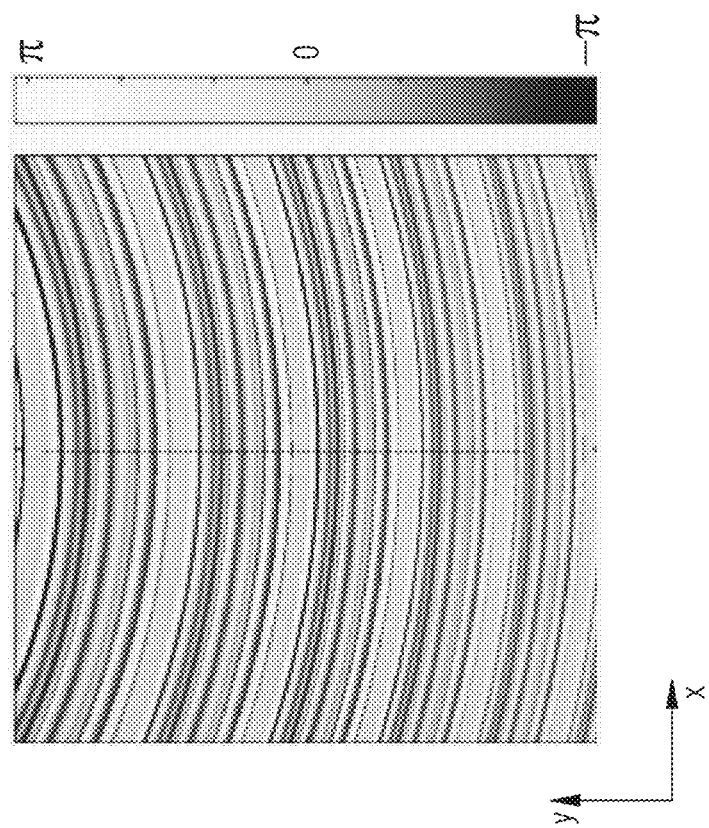
FIG. 5*a* shows a cross-sectional view of a simulated intensity distribution of focus elements for laser processing the workpiece according to some embodiments.
FIG. 5*b* shows a phase distribution assigned to the intensity distribution according to FIG. 5 *a*) according to some embodiments.
Figure 5:
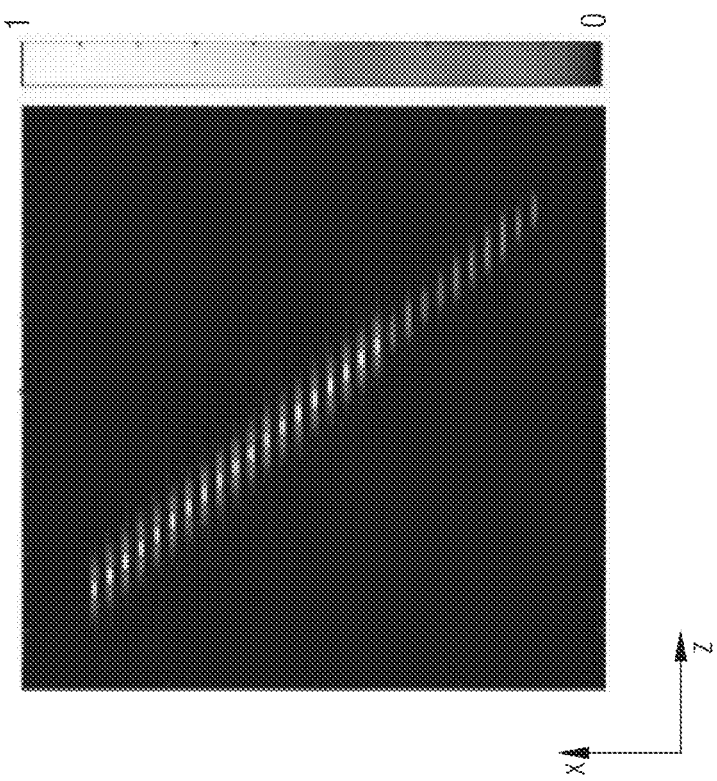

To carry out the beam splitting by means of the beam splitting element 106, a defined transverse phase distribution is applied to the transverse beam cross section 112 of the input laser beam 108. A transverse beam cross section or a transverse phase distribution is to be understood in particular as a beam cross section or a phase distribution in a plane oriented transversely and in particular perpendicularly to the beam propagation direction 124. An example of a transverse phase distribution of beams decoupled from the beam splitting element 106 is shown in FIG. 5b.

The focus elements 120 are formed by interference of the focused partial beams 116, wherein, for example, constructive interference, destructive interference, or intermediate cases thereof can occur, such as partial constructive or destructive interference.

To form the focus elements 120 having the respective distance d and/or position offset, the application of phases by means of the beam splitting element 106 takes place in particular such that the assigned phase distribution for each focus element 120 has a specific optical grating component and/or optical lens component.

Due to the optical grating component, after focusing of the partial beams 116, a corresponding position offset of the focus elements 120 formed results in a first spatial direction, for example, in the x direction. Due to the optical lens component, partial beams 116 or partial beam bundles are incident at different angles or with different convergence or divergence on the focusing optical unit 118, which results after completed focusing in a position offset in a second spatial direction, for example, in the z direction.

The intensity of the respective focus elements 120 is determined by phases of the focused partial beams 116 in relation to one another. These phases are definable by the mentioned optical grating components and optical lens components. The phases of the focused partial beams 116 can be selected in relation to one another in the design of the beam splitting element 106 so that the focus elements 120 each have a desired intensity.

With respect to the technical implementation and properties of the beam splitting element 106, reference is made to the scientific publication "Structured light for ultrafast laser micro- and nanoprocessing" by D. Flamm et al., arXiv:2012.10119v1 [physics.optics], Dec. 18, 2020. Reference is made thereto expressly and in full.

For example, the beam splitting element 106 is formed as a 3D beam splitting element.

It can be provided that the device 100 has a polarization beam splitting element 128. Polarization beam splitting of the input laser beam 108 and/or a partial beam decoupled from the beam splitting element 106 into beams which each have one of at least two different polarization states is carried out by means of the polarization beam splitting element 128.

The polarization beam splitting element 128 can be arranged, for example, before or after the beam splitting element 106 with respect to the beam propagation direction 124 of the input laser beam 108.

In particular, the mentioned polarization states are to be understood as linear polarization states, wherein, for example, two different polarization states are provided and/or polarization states oriented perpendicular to one another are provided.

In particular, beams decoupled from the polarization beam splitting element 128 are polarized in such a way that an electric field is oriented in a plane perpendicular to the propagation direction of the beams (transverse electric).

For the polarization beam splitting, the polarization beam splitting element 128 has, for example, a birefringent lens element and/or a birefringent wedge element. For example, the birefringent lens element and/or the birefringent wedge element are produced from a quartz crystal or comprise a quartz crystal.

With regard to the mode of operation and embodiment of the polarization beam splitting element 128, reference is made to the German patent applications with the application number 10 2020 207 715.0 (filing date: Jun. 22, 2020) and with the application number 10 2019 217 577.5 (filing date: Nov. 14, 2019) of the same applicant. Reference is made thereto expressly and in full.

Due to polarization beam splitting by means of the polarization beam splitting element 128, the partial beams 116 incident on the focusing optical unit 118 each have, for example, one of at least two different polarization states. The focus elements 120 may thus each be formed from beams having a specific polarization state by focusing these partial beams 116 by means of the focusing optical unit 118. A specific polarization state may thus be assigned to each of the focus elements 120.

In particular, it can be provided that focus elements 120 adjacent to one another each have a different polarization state.

In particular, the beam splitting element 106 and/or the polarization beam splitting element 128 are each designed as far field beam forming elements.

Figure 2:
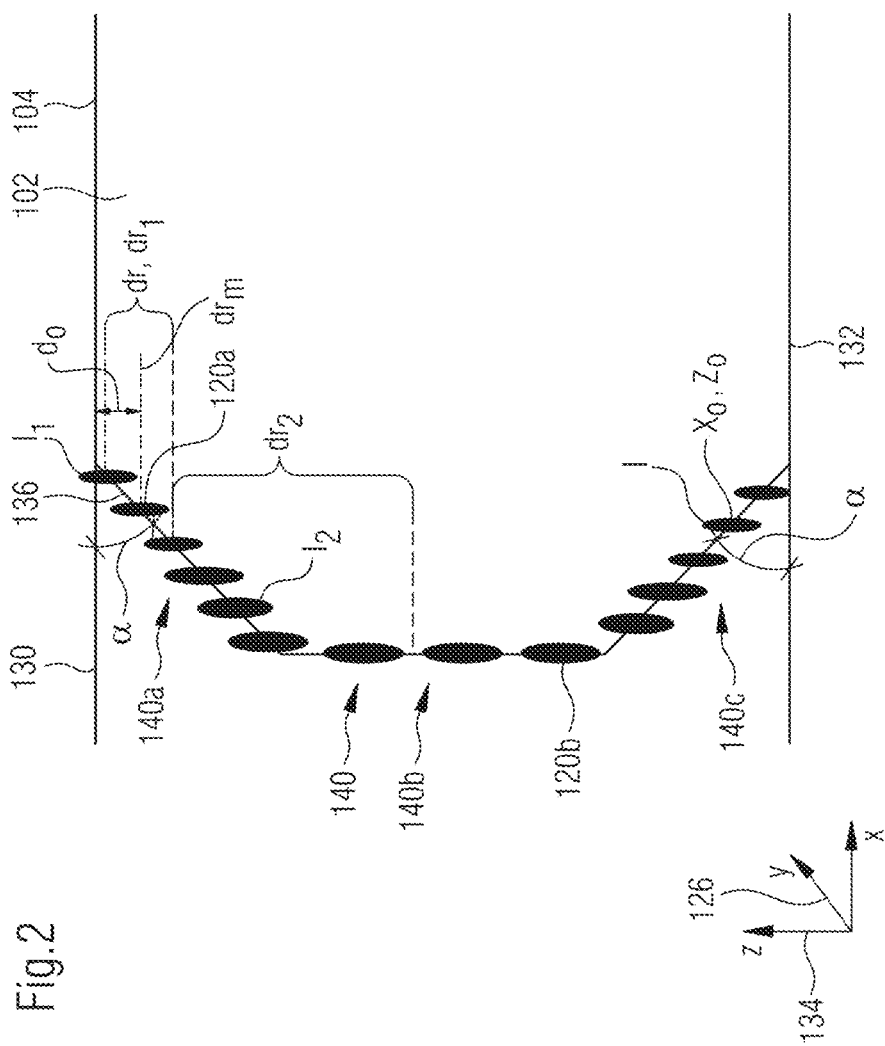
FIG. 2 shows a schematic cross-sectional view of a workpiece which is subjected to multiple focus elements for laser processing according to some embodiments.

At least a subset and/or selection of the focus elements 120 formed is introduced into the material 102 for laser processing the workpiece 104 (FIG. 2).

A specific local position $x_0$, $z_0$ is assigned to each of the focus elements 120 formed, at which a respective focus element 120 is arranged with respect to the material 102 of the workpiece 104. Furthermore, a specific intensity I is assigned to each of the focus elements 120.

In particular, the local positions of the respective focus elements 120 lie in a plane oriented perpendicular to the feed direction 126. In particular, all focus elements 120 formed lie at least in sections in this plane oriented perpendicular to the feed direction 126.

Both the local position $x_0$, $z_0$ and the intensity I of the respective focus elements 120 may be defined by means of the beam splitting element 106. For this purpose, the phase distribution applied by means of the beam splitting element 106 to the beam cross section 112 of the input laser beam 108 is adapted accordingly.

The coupling in of the focus elements 120, which are introduced into the material 102 for laser processing the workpiece 104, takes place, for example, through a first outer side 130 of the workpiece 104.

For example, the workpiece 104 is plate-shaped and/or panel-shaped. A second outer side 132 of the workpiece 104 is arranged, for example, spaced apart in the thickness direction 134 and/or depth direction of the workpiece 104 from the first outer side 130.

The feed direction 126 is oriented transversely and in particular perpendicularly to the thickness direction 134 of the workpiece 104.

In particular, the focus elements 120 formed are arranged along a defined processing line 136. This processing line 136 corresponds to a desired processing geometry, using which the laser processing of the workpiece 104 is to be carried out.

The respective distances d and intensities I of the focus elements 130 arranged along the processing line 136 are selected so that by subjecting the material 102 to these focus elements 120, material modifications 138 are formed (FIG. 4) which enable severing of the material along this processing line 136 and/or a processing surface corresponding to this processing line 136.

In particular, it can be provided that the processing line 136 extends between the first outer side 130 and the second outer side 132 and in particular continuously between the first outer side and the second outer side 132 of the workpiece 104.

It can be provided that the processing line 136 has multiple different sections 140. For example, in the example shown in FIG. 2, the processing line 136 has a first section 140a, a second section 140b, and a third section 140c, wherein, with respect to the thickness direction 134, the second section 140b adjoins the first section 140a and the third section 140c adjoins the second section 140b.

However, the processing line 136 is not necessarily made continuous and/or differentiable. It can be provided that the processing line 136 has interruptions and/or gaps, at which in particular no focus elements 120 are arranged.

The processing line 136 and/or different sections 140 of the processing line 136 can be formed, for example, as a straight line or curve.

Furthermore, the processing line 136 and/or the respective sections 140 of the processing line 136 is assigned a specific angle of attack a and/or angle of attack range, which the processing line 136 or the respective section 140 encloses with the first outer side 130 of the workpiece 104.

In the exemplary embodiment shown, the angle of attack a of the first section 140a and the third section 140c has an absolute value of 45° and that of the second section has an absolute value of 90°.

The focus elements 120 assigned to a specific section 140 can each have different intensities I.

It is provided that the respective intensity I of a specific focus element 120 is selected as a function of a distance do and/or distance range dr, by which the corresponding focus element 120 is spaced apart from an outer side 130, 132 of the workpiece 104 closest to the corresponding focus element 120. A distance direction of the distance do and/or the distance range dr is in particular oriented parallel to the thickness direction 134 of the workpiece 104.

The outer side closest to a focus element 120 is to be understood as the outer side 130, 132 of the workpiece which has the shortest distance to the corresponding focus element 120 and in particular the shortest distance with respect to the thickness direction 134. In the example shown in FIG. 2, the outer side closest to the focus element 120a is the first outer side 130 and the outer side closest to the focus element 120b is the second outer side 132.

Each distance range dr is assigned a mean distance $dr_m$, wherein the mean distance $dr_m$ is to be understood as a mean distance and/or an average distance of the corresponding distance range dr to the closest outer side 130, 132 of the workpiece 104.

In the example according to FIG. 2, a first distance range $dr_1$ and a second distance range $dr_2$ are provided, wherein the focus elements 120 lying in the first distance range $dr_1$ have a first intensity $I_1$ and the focus elements 120 lying in the second distance range $dr_2$ have a second intensity $I_2$ different from the first intensity $I_1$. The intensity $I_2$ is greater than the intensity $I_1$ in this case (indicated in FIG. 2).

For example, the first distance range $dr_1$ and the second distance range $dr_2$ are successive and/or nonoverlapping distance ranges. Different focus elements 120 are thus uniquely assigned to a specific distance range dr.

In the example shown in FIG. 2, the respective intensities $I_1$, $I_2$ of the focus elements 120 lying in the first distance range $dr_1$ and in the second distance range $dr_2$ are at least approximately constant. However, it is also possible in principle that at least one distance range dr is provided in which two or more of the focus elements 120 lying therein have different intensities I from one another.

Figure 3:
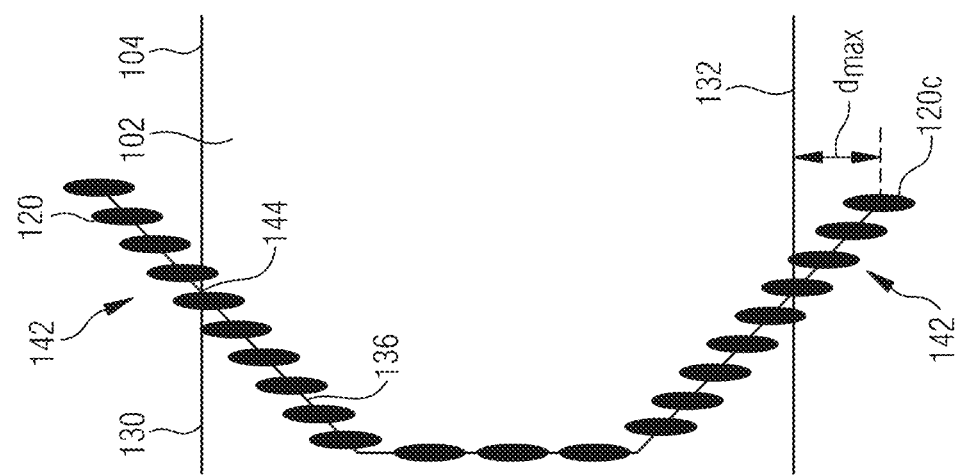
FIG. 3 shows a schematic cross-sectional view of a section of a workpiece subjected to multiple focus elements, wherein multiple focus elements are present, which are positioned outside the workpiece, according to some embodiments.

It can be provided that focus elements 120 are formed which are arranged at least in sections outside the workpiece 104 during the laser processing of the workpiece 104 at a specific point in time and/or at a specific position (FIG. 3). In this case, the processing line 136, along which the focus elements 120 are arranged, has at least one section 142 in which the processing line 136 protrudes beyond the first outer side 130 and/or the second outer side 132 of the workpiece 104.

In the example according to FIG. 3, the processing line has two sections 142.

The section 142 is, for example, a tangential extension of the processing line 136 at an endpoint 144 and/or end section of the processing line 136 arranged within the material 102.

In particular, the section 142 of the processing line 136 arranged outside the material 102 protrudes up to a maximum distance $d_{max}$ above the outer side 130 or 132 of the workpiece 104 closest to the section 142, wherein a distance direction of the maximum distance $d_{max}$ is oriented in the thickness direction 134.

In particular, the maximum distance $d_{max}$ is a distance of a focus element 120c arranged outside the material 102, which has the greatest distance to the closest outer side 130, 132.

The maximum distance $d_{max}$ is in particular selected so that variations of a thickness of the material 102 and/or axial tolerances can be compensated for.

If the thickness of the material 102 increases in a specific area in the feed direction 126, for example, the material 102 is subjected in this area to focus elements 120 which were arranged in a different area outside the material 102.

Figure 4:
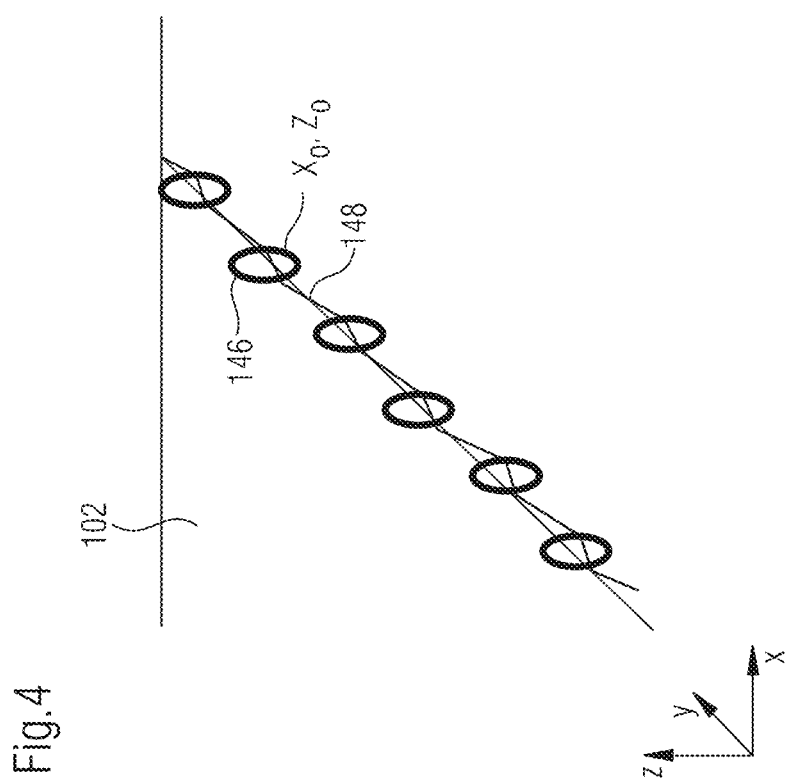
FIG. 4 shows a schematic cross-sectional view of a section of a workpiece in which material modifications, which are accompanied by a crack formation of the material, were produced by subjecting the workpiece to focus elements, according to some embodiments.

By applying and/or introducing the focus elements 120 into the material 102, localized material modifications 146 are formed in each case, which are arranged at the respective local positions $x_0$, $z_0$ of the corresponding focus elements 120 in the material 102 (FIG. 4).

By suitable selection of processing parameters, such as the respective distances d between the focus elements 120, their respective intensities I, a feed speed oriented in the feed direction 126, and the laser parameters of the input laser beam 108, the material modifications 146 can be formed, for example, as type III modifications, which are accompanied by a spontaneous formation of cracks 148 in the material 102 of the workpiece 104. In particular, cracks 148 are formed between mutually adjacent material modifications 146.

Alternatively thereto, it is also possible by suitable selection of the processing parameters to form the material modifications 146 as type I and/or type II modifications, which are accompanied by a heat accumulation in the material 102 and/or by a change of an index of refraction of the material 102.

The formation of the material modifications 146 as type I and/or type II modifications is associated with a heat accumulation in the material 102 of the workpiece 104. In particular, to form these material modifications 146, the respective distance d between the focus elements 120 is selected as sufficiently small that this heat accumulation occurs when the material 102 is subjected to the focus elements.

FIG. 5a shows a simulated intensity distribution of a plurality of focus elements 120, wherein the focus elements arranged at the bottom with respect to the z direction have a lower intensity I than the focus elements 120 arranged at the top. In the grayscale value representation shown, brighter areas represent higher intensities.

FIG. 5b shows a phase distribution, assigned to the intensity distribution according to FIG. 5a, of beams decoupled from the beam splitting element 106, wherein the grayscale value scale extends from white (phase +Pi) to black (phase −Pi).

The laser processing of the workpiece 104 by means of the device 100 functions as follows:

To carry out the laser processing, the material 102 of the workpiece 104 is subjected to the focus elements 120 and the focus elements 120 are moved in the feed direction 126 relative to the workpiece 104 through its material 102.

In this case, the material 102 is a material transparent to a wavelength of beams from which the focus elements 120 are formed. For example, the material 102 is a glass material.

Figure 6:
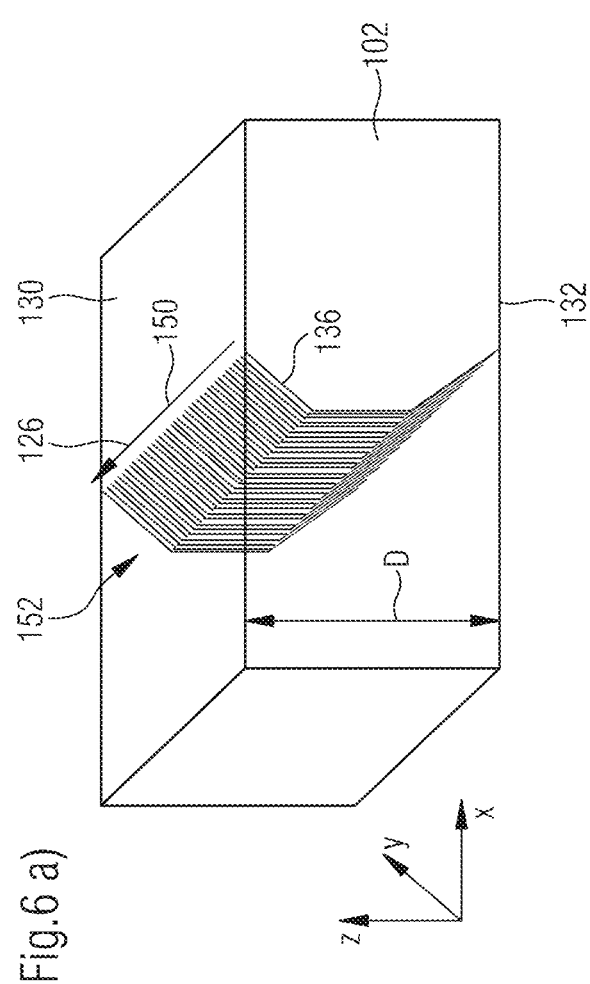
FIG. 6*a* shows a schematic perspective view of a workpiece having material modifications formed thereon, which extend along a processing line and/or processing surface, according to some embodiments.
FIG. 6*b* shows a schematic view of two workpiece segments, which are formed by severing the workpiece according to FIG. 6 *a*) along the processing line and/or processing surface, according to some embodiments.
Figure 6:
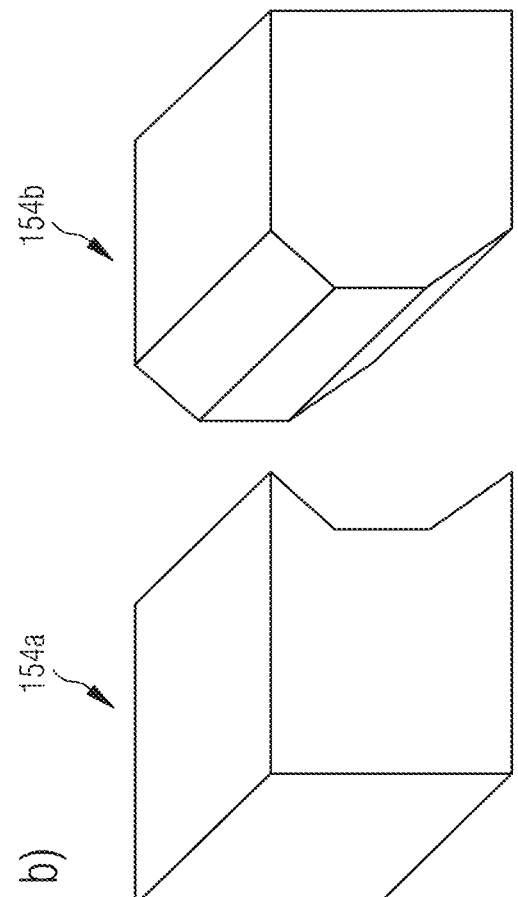

Material modifications 146, which are arranged along the processing line 136, are formed in the material 102 by subjecting the material 102 to the focus elements 120. In the example shown in FIG. 6, material modifications 146 are formed continuously over a thickness D of the material 102 oriented in the thickness direction 134.

By relative movement of the focus elements 120 in relation to the material 102 along a predetermined trajectory 150, a processing surface 152 corresponding to the processing line 136 is formed, on which the material modifications 146 are arranged. A planar formation and/or arrangement of the material modifications 146 along the processing surface 152 thus results.

A distance between adjacent material modifications 138 in the feed direction 126 may be defined, for example, by setting a pulse duration of the input laser beam 108 and/or by setting the feed speed.

The material modifications 146 formed along the processing surface 152 result in particular in a reduction in a strength of the material 102. The material 102 may thus be severed after formation of the material modifications 146 at the processing surface 152, for example, by exerting a mechanical force, into two workpiece segments 154a and 154b different from one another (FIG. 6b).

The workpiece segment 154b in the example shown is a product piece segment having a desired edge shape, which corresponds to the shape of the processing line 136. In this case, the workpiece segment 188b is a residual workpiece segment and/or scrap segment.

For example, the material 102 of the workpiece 104 is quartz glass. For example, to form the material modifications 146 as type I and/or type II modifications, a laser beam from which the focus elements 120 are formed has a wavelength of 1030 nm and a pulse duration of 1 ps. Furthermore, a numerical aperture assigned to the focusing optical unit 118 is then 0.4 and a pulse energy assigned to a single focus element 120 is then 50 to 200 nJ.

To form the material modifications 146 as type III modifications with otherwise unchanged parameters, the pulse energy assigned to a single focus element 120 is 500 to 2000 nJ.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

α angle of attack
d distance $d_0$ distance
$d_{max}$ maximum distance
dr distance range
$dr_1$ distance range
$dr_2$ distance range
$dr_m$ mean distance
D thickness
I intensity
$I_1$ intensity
$I_2$ intensity
L protrusion length
$x_0$ position in the x direction
$z_0$ position in the y direction
100 device
102 material
104 workpiece
106 beam splitting element
108 input laser beam
110 laser source
112 beam cross section
114 wavefront
116 partial beams
116a partial beam
116b partial beam
118 focusing optical unit
120 focus elements
120a focus element
120b focus element
120c focus element
121 focus distribution
122 beam forming device
124 beam propagation direction
126 feed direction
128 polarization beam splitting element
130 first outer side
132 second outer side
134 thickness direction
136 processing line
138 material modification
140 section
140a first section
140b second section
140c third section
142 section
144 endpoint/end section
146 material modification
148 crack
150 trajectory
152 processing surface
154a workpiece segment
154b workpiece segment

The invention claimed is:

1. A method for laser processing a workpiece, the workpiece comprising a material transparent to a laser beam of the laser processing, the method comprising:
splitting an input laser beam by using a beam splitter into three or more partial beams, wherein the splitting of the input laser beam is performed by application of phases to a beam cross section of the input laser beam,
focusing the three or more partial beams decoupled from the beam splitter by using a focusing optical unit, wherein multiple focus elements are formed by the focusing of the three or more partial beams, and
subjecting the material of the workpiece to at least a subset of the multiple focus elements, wherein the application of the phases is performed in such a way that at least three focus elements of the multiple focus elements have different distances from an outer side of the workpiece closest to the three focus elements and have different intensities from each other, and wherein a respective intensity of each respective focus element of the three focus elements is selected to be increasingly greater with increasing distance of the respective focus element from the outer side of the workpiece closest to the respective focus element.

2. The method as claimed in claim 1, wherein the intensity of each respective focus element is selected so that identical material modifications are produced in the material by the subjecting the material to the multiple focus elements independent of a respective distance of the respective focus element to the outer side of the workpiece.

3. The method as claimed in claim 1, wherein the multiple focus elements different from one another are spaced apart along a processing line, and by the subjecting the material of the workpiece to the multiple focus elements, material modifications are formed in the material, thereby enabling severing of the material along the processing line.

4. The method as claimed in claim 3, wherein an angle of attack between the processing line and the outer side of the workpiece, through which the focus elements for laser processing are coupled into the material of the workpiece, is at least 1° and at most 90°.

5. The method as claimed in claim 1, wherein one or more of the focus elements are arranged at least in sections.

6. The method as claimed in claim 1, wherein one or more of the focus elements are arranged at least temporarily outside the material of the workpiece during the laser processing of the workpiece.

7. The method as claimed in claim 1, wherein the beam splitter comprises a polarization beam splitter, so that the partial beams have one of at least two different polarization states, wherein the focus elements having different polarization states are formed by focusing the partial beams by the focusing optical unit, and wherein the focus elements having different polarization states are arranged adjacent to one another.

8. The method as claimed in claim 1, wherein material modifications associated with a crack formation of the material are formed in the material by the subjecting the material of the workpiece to the focus elements.

9. The method as claimed in claim 1, wherein type III material modifications are formed in the material by the subjecting the material of the workpiece to the focus elements.

10. The method as claimed in claim 1, wherein material modifications associated with a change of an index of refraction of the material are formed in the material by the subjecting the material of the workpiece to the focus elements.

11. The method as claimed in claim 1, wherein type I material modifications and/or type II material modifications are formed in the material by the subjecting the material of the workpiece to the focus elements.

12. A device for laser processing a workpiece, wherein the workpiece comprises a material transparent to a laser beam of the laser processing, the device comprising:
a beam splitter for splitting an input laser beam into three or more partial beams, wherein the splitting of the input laser beam by the beam splitter is performed by application of phases to a beam cross section of the input laser beam, and
a focusing optical unit for focusing the three or more partial beams, wherein multiple focus elements for laser processing the workpiece are formed by the focusing of the three or more partial beams, wherein the application of phases by the beam splitter is performed such that at least three focus elements of the multiple focus elements have different distances from an outer side of the workpiece closest to the three focus elements and have different intensities from each other, and wherein a respective intensity of each respective focus element of the three focus elements is selected to be increasingly greater with increasing distance of the respective focus element from the outer side of the workpiece closest to the respective focus element.

13. The device as claimed in claim 12, wherein the splitting of the input laser beam by the beam splitter is performed by phase manipulation of a phase of the input laser beam.

14. The method as claimed in claim 1, wherein the three focus elements are offset from each other in a direction parallel to the outer side of the workpiece.

15. The device as claimed in claim 12, wherein the three focus elements are offset from each other in a direction parallel to the outer side of the workpiece.

\* \* \* \* \*